Dec. 16, 1969    M. P. MacMARTIN ET AL    3,484,691
MAGNETIC FLUX MODULATOR FOR DIRECT CURRENT MEASUREMENT
Filed Nov. 7, 1966

INVENTORS
MALCOLM P. MACMARTIN
NORBERT L. KUSTERS
By
AGENT

United States Patent Office 3,484,691
Patented Dec. 16, 1969

3,484,691
MAGNETIC FLUX MODULATOR FOR DIRECT CURRENT MEASUREMENT
Malcolm Pearson MacMartin and Norbert Leo Kusters, Ottawa, Ontario, Canada, assignors to Canadian Patents and Development Limited, Ottawa, Ontario, Canada, a Canadian corporation
Filed Nov. 7, 1966, Ser. No. 592,653
Int. Cl. G01r 33/00
U.S. Cl. 324—117
1 Claim

ABSTRACT OF THE DISCLOSURE

A magnetic flux modulator for direct current measurement of the type having two high permeability detection cores with windings energized by a square wave oscillator such as to drive each core into saturation twice each cycle and a detector to measure even harmonic content of the output signal which is proportional to the net direct flux in the cores and thus the direct current being measured, the improvement being means for taking a feedback signal directly from the detection cores and applying it to the oscillator such as to switch the oscillator when the detection cores saturate to predetermined and constant degree.

---

This invention relates to a magnetic modulator for a direct current comparator.

The direct current comparator is a known magnetic device in which the direct magnetic flux in two toroidal detection cores is measured by a modulation technique. Because the device is dealing with direct current it is necessary to modulate the flux and it is standard practice to do this in effect by driving the flux in the detection cores between positive and negative saturation levels. A common form of comparator of this type comprises two toroids of high permeability, square loop magnetic material, windings on each core, connected in series, and an oscillator whose output is connected across the two series windings. The oscillator output voltage, and the number of turns of the windings are matched so that each core is driven into saturation twice each cycle. The windings are connected in series so that an external direct flux provided by the current in the windings around both cores aids the saturation of one core and retards the saturation of the other. A peak detector measures the even harmonic content of the output signal, which is proportional to the direct flux in the cores.

Direct current comparators of the type described above are subject to certain errors that effect the accuracy of the measurements. Extreme care in the design and matching of the components of the device must be exercised if precise readings are to be obtained. Zero drift is the largest error of the comparator and the major factor causing this drift is due to temperature variations which affect the saturation levels of the magnetic cores of the comparator which may not have identical magnetic characteristics. In addition, it is standard practice to use a square-wave oscillator of the Royer type as the modulation supply and the magnetic core used in this circuit are affected by temperature changes.

It is therefore an object of the invention to provide a magnetic modulator for a direct current comparator wherein the errors in accuracy of measurement are greatly reduced.

It is another object of the invention to provide a magnetic modulator in which the necessity for extreme care in the design and matching of the electrical components is greatly reduced.

It is another object of the invention to provide apparatus of the type described wherein effects due to temperature variations are eliminated or greatly minimized.

These and other objects of the invention are achieved by providing a magnetic modulator for a direct current comparator of the type having two detection cores of high permeability, windings in each core connected in series, an oscillator whose output is connected across the two series windings and operating such as to drive each core into saturation twice each cycle, and a detector that measures the even harmonic content of the output signal, said detector reading being proportional to the direct flux in the cores, wherein the oscillator switching signal is obtained directly from the detection cores.

In drawings which illustrate an embodiment of the invention,

Figure 1:
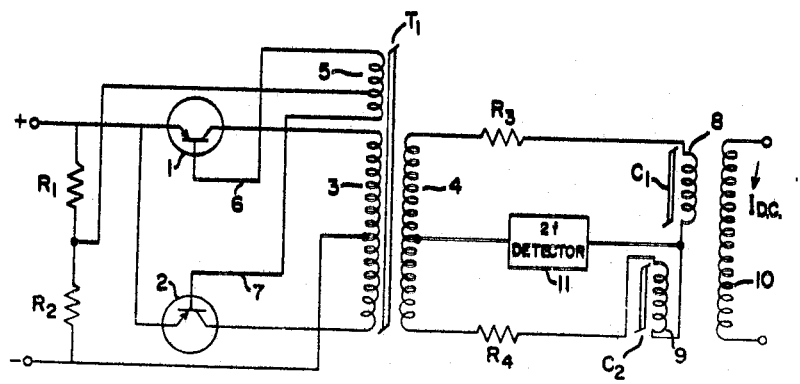
FIGURE 1 is a circuit diagram of the prior modulator presently in use.

Referring to FIGURE 1, a modulator for a direct current comparator of a type presently used is shown. This consists of two transistors 1 and 2 connected to the primary windings 3 of a saturable core transformer $T_1$. Drive current for switching the transistors is taken from a winding 5 via lines 6 and 7 to the bases of the transistors. A direct current supply, input resistors $R_1$ and $R_2$ and an output winding 4 on transformer $T_1$ complete a square-wave oscillator generally known as a Royer-type oscillator. This device supplies square wave voltage pulses via load resistors $R_3$ and $R_4$ to windings 8 and 9 connected in series and wound on flux detection cores $C_1$ and $C_2$. The direct current $I_{DC}$ to be measured flows in windings 10 also wound on cores $C_1$ and $C_2$. Detection cores $C_1$ and $C_2$ would normally be two toroids of high permeability, a square loop material with windings 8, 9, and 10 suitably wound thereon to form a current comparator. An even harmonic detector 11 connected between a center-tap on transformer winding 4 and the connection between windings 8 and 9 measures the even harmonic content of the output signal of the oscillator. When $I_{DC}=0$, no reading is obtained on detector 11. However, if a current flows in winding 10 a reading is obtained in the detector proportional to the direct flux in the cores and thus the direct current to be measured. The oscillator output voltage, and the number of turns of the windings are matched such that each core is driven into saturation twice each cycle of the oscillator. The direct flux induced by the current in winding 10 around both cores aids to the saturation of one core and retards the saturation of the other resulting in an imbalance in the circuit that can readily be measured.

Figure 2:
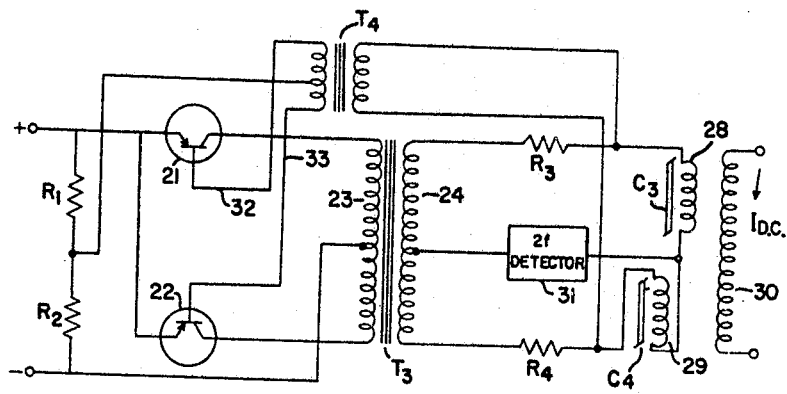
FIGURE 2 is a circuit diagram of an improved modulator according to the invention.

FIGURE 2 shows an improved modulator according to the invention. In this case switching transistors 21 and 22 are connected to the primary winding 23 of a conventional (non-saturating core) transformer $T_3$. The secondary 24 is connected to windings 28 and 29 in series and wound on saturating detection cores $C_3$ and $C_4$. In this case cores $C_3$ and $C_3$ not only act as detection cores but also provide the switching signal for the transistors in the oscillator. A fraction of the voltage across the windings on the flux detection cores 28 and 29 supplies via base drive transformer $T_4$ and lines 32 and 33 the drive to the bases of the transistors in the oscillator.

The flux detection cores act as timing cores of the oscillator. The peak flux on the cores remains the same even if the temperature or some other factor changes. The frequency of the oscillator is adjusted automatically to keep it constant because the oscillator transistors switch as soon as the voltage on the base drive transformer drops by a given amount. The flux detection cores always saturate by the same amount even if the temperature changes. A device that is almost independent of temperature effects results.

A Royer-type oscillator is used because it is simple and convenient. Other types of triggered oscillators might be used as the modulation supply and these would be adapted to be switched by timing signals from the detection cores.

What we claim is:

1. A direct current measuring device of the type employing a magnetic modulator comprising,
   (a) a pair of detection cores of high permeability material,
   (b) windings on each of said cores, said windings being connected in series,
   (c) a third winding on both of said cores for carrying the direct current to be measured,
   (d) a square-wave oscillator comprising a transformer having primary and secondary windings, two switching transistors for controlling current flow in the transformer primary, means connecting the secondary across the series connected windings such as to drive each core into saturation twice each cycle of the oscillator, and timing and control feedback means operative to switch the transistors when the detection cores saturate to a predetermined and constant degree,
   (e) detector means for measuring an even harmonic content of the current appearing in the windings on the detection cores, said measurement being related to the direct flux in the cores and thus the direct current in the third winding.

References Cited

UNITED STATES PATENTS

| | | | |
|---|---|---|---|
| 2,873,371 | 2/1959 | Van Allen | 331—113.1 |
| 2,875,412 | 2/1959 | Kaplan | 324—12 |
| 2,979,674 | 4/1961 | Schenkerman | 332—12 |
| 2,994,840 | 8/1961 | Dorsman | 332—12 |
| 3,139,595 | 6/1964 | Barber | 332—12 |
| 3,199,051 | 8/1965 | Hills et al. | 332—12 XR |
| 3,275,949 | 9/1966 | Johnson | 332—12 |
| 3,135,911 | 6/1964 | Van Allen | 324—127 XR |

RUDOLPH V. ROLINEC, Primary Examiner

E. F. KARLSEN, Assistant Examiner

U.S. Cl. X.R.

332—12